United States Patent
Gschwind

(12) 
(10) Patent No.: US 6,189,088 B1
(45) Date of Patent: Feb. 13, 2001

(54) FORWARDING STORED DARA FETCHED FOR OUT-OF-ORDER LOAD/READ OPERATION TO OVER-TAKEN OPERATION READ-ACCESSING SAME MEMORY LOCATION

(75) Inventor: Michael K. Gschwind, Danbury, CT (US)

(73) Assignee: International Business Machines Corporation, Armonk, NY (US)

(*) Notice: Under 35 U.S.C. 154(b), the term of this patent shall be extended for 0 days.

(21) Appl. No.: 09/243,721

(22) Filed: Feb. 3, 1999

(51) Int. Cl.$^7$ ............................................. G06F 9/312

(52) U.S. Cl. .............................. 712/216; 712/23; 712/225

(58) Field of Search ............................. 712/23, 216, 225

(56) References Cited

U.S. PATENT DOCUMENTS

| | | | |
|---|---|---|---|
| 5,420,990 | 5/1995 | McKeen et al. | 712/216 |
| 5,421,022 | 5/1995 | McKeen et al. | 712/23 |
| 5,542,075 | 7/1996 | Ebcioglu et al. | 717/9 |
| 5,606,670 * | 2/1997 | Abramson et al. | 711/154 |
| 5,689,712 | 11/1997 | Heisch | 717/4 |
| 5,758,081 | 5/1998 | Aytac | 709/212 |
| 5,960,467 * | 9/1999 | Mahalingaiah et al. | 711/214 |

FOREIGN PATENT DOCUMENTS

| | | |
|---|---|---|
| 0709770 | 5/1996 | (EP) . |
| 0742512 | 11/1996 | (EP) . |
| 2265481 | 9/1993 | (GB) . |

OTHER PUBLICATIONS

Diefendorff, et al., "Organization of the Motorola 88110 Superscaler RISC Microprocessor", 1992 IEEE Micro, pp. 40–63.

* cited by examiner

Primary Examiner—Kenneth S. Kim
(74) Attorney, Agent, or Firm—F. Chau & Associates, LLP

(57) ABSTRACT

The present invention is directed to method and apparatus for reordering load operations in a computer processing system. In one aspect of the invention, a method for scheduling instructions for execution in a computer processing system implementing out-of-order execution, includes the steps of: selecting and moving a next instruction from its current position in a sequence of instructions to an earlier position; determining whether the selected instruction may reference a memory location for read-access; determining whether non-selected instructions, which may ambiguously reference the memory location for read-access, were previously moved over the selected instruction, when the selected instruction may reference the memory location for read-access; establishing a bypass sequence to be performed during an execution of the selected instruction and which passes data previously read-accessed by the non-selected instructions to the selected instruction, when the non-selected instructions were previously moved over the selected instruction and addresses of memory locations from which the non-selected instructions have read-accessed the data are the same as an address of the memory location from which the selected instruction is to read-access data; determining whether the selected instruction was previously moved over the non-selected instructions, when the selected instruction may reference the memory location for read-access; and adding a mechanism for storing a record of the selected instruction for future reference by the non-selected instructions.

37 Claims, 7 Drawing Sheets

FORWARDING STORED DARA FETCHED FOR OUT-OF-ORDER LOAD/READ OPERATION TO OVER-TAKEN OPERATION READ-ACCESSING SAME MEMORY LOCATION

BACKGROUND

1. Technical Field

The present invention generally relates to computer processing systems and, in particular, to method and apparatus for reordering load operations in a computer program. The invention is applicable to operations reordered when the program is generated (static reordering) as well as to operations reordered at execution time (dynamic reordering).

2. Background Description

Contemporary high-performance processors rely on superscalar, superpipelining, and/or very long instruction word (VLIW) techniques for exploiting instruction-level parallelism in programs (i.e., for executing more than one instruction at a time). In general, these processors contain multiple functional units, execute a sequential stream of instructions, are able to fetch from memory more than one instruction per cycle, and are able to dispatch for execution more than one instruction per cycle subject to dependencies and availability of resources.

The pool of instructions from which the processor selects those that are dispatched at a given point in time is enlarged by the use of out-of-order execution. Out-of-order execution is a technique by which the operations in a sequential stream of instructions are reordered so that operations appearing later are executed earlier, if the resources required by the later appearing operations are free. Thus, out-of-order execution reduces the overall execution time of a program by exploiting the availability of the multiple functional units and using resources that would otherwise be idle. Reordering the execution of operations requires reordering the results produced by those operations, so that the functional behavior of the program is the same as what would be obtained if the instructions were executed in their original sequential order.

In the case of memory-related operations, a memory load operation reads a datum from memory, loads it in a processor register, and frequently starts a sequence of operations that depend on the datum loaded. Thus, in addition to using idle resources, the early (out-of-order) initiation of memory load operations may hide delays in accessing memory, including potential cache misses.

In general, there are two basic approaches to implementing out-of-order execution and reordering of results: dynamic reordering and static reordering. In dynamic reordering, the instructions are analyzed at execution time, and the instructions and results are reordered in hardware. In static reordering, a compiler/programmer analyzes and reorders the instructions and the results produced by those instructions when the program is generated, thus the reordering tasks are accomplished through software. These two approaches can be jointly implemented.

While significant research has been performed to support out-of-order execution in general, and between memory operations in particular, such research has primarily concentrated on uniprocessor execution. This in turn has focused on the ordering between load and (synchronous) store operations in a single instruction stream designed to execute on a single processor. This invention deals with the problem of asynchronous memory references typically found in multiprocessing environments, and their impact on reordering between multiple read operations from a single memory cell. While such transformations (i.e., reorderings) are safe in a strict uniprocessor environment, multiprocessor environments pose additional considerations such as, for example, the possibility of writes being performed by another processor with a distinct, unknown instruction stream.

To achieve predictable and repeatable computation of programs, a requirement of 'sequential consistency' is described in the article by L. Lamport, "How to Make a Multiprocessor that Correctly Executes Multiprocess Programs", IEEE Transactions on Computers, C-28(9), pp. 690–91 (September 1979). The article by Lamport defines a multiprocessor system as sequentially consistent if "the result of any execution is the same as if the operations of all processors were executed in some sequential order, and the operations of each individual processor appear in this sequence in the order specified by its program". For static speculative execution, the order of the original logical program text is authoritative, not the reordered program text, and the compiler and hardware implementation must collaborate to generate an execution equivalent to that original order.

To achieve proper performance while simplifying coherence protocols between multiple processors in a system, several relaxations of the above described strictly sequential consistent order are possible. The types of re-ordering which are allowable depend on the memory consistency model guaranteed by a particular implementation. An overview of currently used and proposed consistency models and their characteristics is described in the article by S. Adve and K. Gharachorloo, "Shared Memory Consistency Models: A Tutorial", Technical Report 9512, Dept. of Electrical and Computer Engineering, Rice University, Houston, Tex. (September 1995).

A basic requirement in all these relaxed models is write serialization to achieve memory coherence, i.e., all writes to the same location are serialized in some order and are performed in that order with respect to any processor. This is equivalent to sequential consistency described by Lamport wherein each memory cell is considered a memory module. We will refer to sequential consistency with respect to a single memory cell as write serial, so as to differentiate it from sequential consistency for a larger memory module. Memory coherence can be achieved by ensuring that successive load operations to the same memory location preserve a weakly ascending order of data items presented in that memory location. Thus, in a sequence of load operations, any load may present only the same or a later data item as its predecessors.

For example, consider a sequence of data items d1, d2, d3, d4, d5, d6 and so forth, written into a given memory location by a second processor. Successive load operations from that memory location by a first processor may present the same data item as returned by the first load operation, or a later item present in that memory cell. Thus, if the first load operation returned data item d2, then the second load operation may return data items d2, d3, d4 and so forth, but not data item d1. Alternatively, if the first load operation returned data item d4, then the second load operation may return data items d4, d5, d6 and so forth, but not data items d1, d2, or d3.

It is evident that in serial execution, this problem is resolved automatically by the nature of time moving forward. However, with respect to out-of-order processors, load operations which access the same memory location may get out-of-order such that a statically later load instruction would read a data item earlier in the sequence of data items than its statically preceding load instruction, which is executed at a later time.

One factor that limits the ability to reorder operations is ambiguous memory references. This is the case when a memory load operation appears after another memory load operation in a sequential instruction stream, and it is not possible to determine ahead of time whether the memory locations accessed by an out-of-order and an in-order load operation are different. For example, consider the following code fragment:

s=*(X+a*4+5)
u=s+4
t=*Y
v=t+8 wherein * denotes a memory access to the specified address, such that:
*Y indicates the memory location whose address is contained in Y; and
*(X+a*4+5) indicates the memory location whose address is specified by the expression X+a*4+5.

Assuming that a is a value stored in register r1 of a processor, X and Y are in registers r2 and r9, and s, t, u and v are assigned to registers r4, r5, r6 and r7, respectively, then the above code fragment can be represented by the following instruction sequence (wherein the first register after the name of the instruction is the target register, and the remaining registers are the operands):

| | | |
|---|---|---|
| mul | r10, r1, 4 | ; r10 = a*4 |
| add | r11, r10, 5 | ; r11 = a*4+5 |
| add | r12, r11, r2 | ; r12 = X+a*4+5 |
| load | r4, (r12) | ; s = *(X+a*4+5) |
| add | r6, r4, 4 | ; u = s + 4 |
| load | r5, (r9) | ; t = *Y |
| add | r7, r5, 8 | ; v = t + 8 |

If it can be determined that X+a*4+5 and Y refer to different addresses, then the four expressions can be scheduled for parallel execution, yielding, for example, the following sequence (wherein the symbol ∥ denotes parallel execution):

| | | | | |
|---|---|---|---|---|
| mul | r10, r1, 4 | ∥ | load | r5, (r9) |
| add | r11, r10, 5 | ∥ | ... | |
| add | r12, r11, r2 | ∥ | add | r7, r5, 8 |
| load | r4, (r12) | ∥ | ... | |
| ... | | ∥ | ... | |
| add | r6, r4, 4 | ∥ | ... | |

In a machine with two execution units, the sequence above would take 6 cycles to complete (assuming that a load takes two cycles, and other operations take a single cycle).

On the other hand, if it cannot be determined whether X+a*4+5 and Y are always different (i.e., the addresses are ambiguous), then the two expressions would have to be scheduled in the original order, taking 9 cycles to complete (again, assuming that a load takes two cycles, and other operations take a single cycle).

If both load addresses reference the same memory location, and that memory location receives the data item sequence of d1 followed by d2, a total of four combinations of read-accesses for variables s and t are possible. Of these, the first three combinations shown below are write serialized, whereas the fourth combination does not satisfy the requirement of write serialization.

| | write serial | write serial | write serial | not write serial |
|---|---|---|---|---|
| first load operation (s) | d1 | d1 | d2 | d2 |
| second load operation (t) | d1 | d2 | d2 | d1 |

Note how in the following example the reordered scheme of instructions will cause the actual user program which reads variable s followed by variable t to see a sequence of a later data item d2 preceding an earlier data item d1 if both load operations reference the same memory location. This is a significant problem with respect to synchronizing multiprocessors, or communicating with DMA devices:

second processor writes datum d1 to memory location referenced by load into s and t

| -- second processor writes datum d1 to memory location referenced by load into s and t -- | | | | |
|---|---|---|---|---|
| mul | r10, r1, 4 | ∥ | load | r5, (r9) |
| add | r11, r10, 5 | ∥ | ... | |
| -- second processor modifies datum to d2 -- | | | | |
| add | r12, r11, r2 | ∥ | add | r7, r5, 8 |
| load | r4, (r12) | ∥ | ... | |
| ... | | ∥ | ... | |
| add | r6, r4, 4 | ∥ | ... | |

This has the net effect of loading d2 into s and d1 into t, which is not consistent with the write serialized sequence of values which was actually stored by the second processor in the memory location accessed by both load operations.

The example above is not atypical. Ambiguity in memory references severely degrades system performance by forcing the sequential execution of operations that could otherwise be executed in parallel. However, such serialization of instructions can be avoided (that is, a logical successor load operation can be performed earlier than a logically preceding load operation) as long as the sequence of load result values perceived by the user program is write serialized. Thus, the out-of-order load operation performed earlier than the in-order load operation is valid as long as the data sequence of the load operations in their original program order is consistent with the corresponding data sequence in memory (i.e., each successor load returns the same value or a value occurring later on the time line with respect to all logically preceding read operations). Moreover, if these values are consistent, then any operation that depends on the datum loaded out-of-order can also be performed out-of-order. On the other hand, if the values are not consistent, then the datum loaded out-of-order and any results derived from it are invalid, making it necessary to re-execute the load operation at the in-order point as well as the associated dependent operations.

Various attempts have been made towards solving the problem of reordering memory operations with ambiguous references by processors. Most of these schemes assume that instructions are reordered statically (i.e., when the programs are generated). All these schemes rely on detecting interference through either address comparison or load result value comparison. If interference is detected, then the out-of-order load operation scheduled to execute before the in-order load operation (and those operations that depend on the load which has already been executed, if applicable) must be re-executed at its original in-order point. That is, the mechanisms enforce write serialization by re-executing all interfering load operations in-order. Interference detection and re-execution are performed either by extra instructions (software-based schemes), or by dedicated hardware resources (hardware-based schemes) sometimes with software assistance.

To ensure correctness when addresses overlap, the existing mechanisms: recognize that a load instruction previously executed (i.e., an out-of-order load instruction) interfered with another load instruction (i.e., an in-order load instruction); and re-execute the previously executed out-of-order load instruction, and any instructions that depend on the load instruction which has already been executed (i.e., the out-of-order load instruction).

For example, the code fragment given earlier could be modified as follows:

t=*Y
v=t+8
s=*(X+a*4+5)
u=s+4
if (Y==(X+a*4+5))/*compare addresses*/
    t=*Y
    v=t+8
endif In the case of static reordering, the sequence of instructions generated by the compiler/programmer differs among the various schemes proposed. Usually, a load instruction which has been moved over another load instruction is replaced by some new instruction (or instruction sequence) which performs the load operation and starts monitoring the addresses used by other load instructions. Another instruction (or an instruction field in the out-of-order load instruction) is used to indicate the place where the moved load instruction was originally located, which determines the end of the range of monitoring for interfering store operations.

In the case of dynamic reordering, the various load instructions are presented to the processor in program order, that is, the first load instruction is followed by the second load instruction. The processor reorders the instructions and, as in the case of static reordering, the processor must be able to detect if the first load instruction loads a memory location read by the second, out-of-order load operation which has already been executed. Thus, the processor must mark the load instruction as an out-of-order operation, set up a mechanism for detecting interference between out-of-load operations with respect to other load operations, recover the state of the processor when interference is detected, and re-execute the out-of-order load instruction as well as any other instructions which are dependent on the out-of-order load operation.

A summary of related art dealing with asynchronous memory operations in a multiprocessor environment when reordering memory load operations is now set forth.

A support mechanism for out-of-order load operations based on the detection of interference and the re-issuance of previously executed out-of-order load instructions is disclosed in U.S. Ser. No. 08/829,669, filed Mar. 31, 1997, entitled "Support for Out-Of-Order Execution of Loads and Stores in a Processor", and assigned to the assignee herein. The mechanism enters the address of each out-of-order load operation in a queue ("load-hit-load queue") until the original program location of the out-of-order load is reached. Other (in-order) load operations verify their addresses against the entries in the load-hit-load queue and, if interference is detected, then the interfering out-of-order load (and all depending operations) are re-issued by the processor.

An alternative detection mechanism is described in the context of load/store interference detection based on load data verification in U.S. Pat. No. 5,758,051, issued May 26, 1998, entitled "Method and Apparatus for Reordering Memory Operations in a Processor", and assigned to the assignee herein. In this approach, data items accessed by an out-of-order load operation are read in-order, and the result of the in-order load operation is compared to the out-of-order result. If the two values are identical, then no detectable interference has occurred and the program continues execution. However, if the two values are not identical, then the value returned by the in-order load operation is used to re-execute all dependent instructions. Note that for interference detection based on load verification, if interference cannot be detected, then it is presumed that no interference exists. This approach reduces the amount of hardware necessary to monitor interference and the number of re-executions, but requires additional bandwidth to perform a second in-order load for every load operation moved out-of-order.

U.S. Pat. No. 5,625,835, issued on Apr. 29, 1997, entitled "Method and Apparatus for Reordering Memory Operations in a Superscalar or Very Long Instruction Word Processor", and assigned to the assignee herein, combines reordering of memory operations with speculative execution of memory operations. The reordering of memory operations relies on:

static reordering of code by the compiler to exploit instruction-level parallelism;
  special hardware support to detect conflicts in memory references and manipulate data loaded out-of-order; and
  compiler-generated code for operating on the data loaded out-of-order and for recovering from the detection of conflicts.

The special hardware support consists of an address register for each register which can be the destination for the result of a load operation executed out-of-order, and a comparator associated with each such address register. 'Special instructions' are used to load a datum out-of-order and to 'commit' such datum as well as any other values derived from it at in-order points in the program. Each out-of-order load records in the corresponding address register the memory address and size of the datum loaded; each store operation triggers the comparison of the (address, size) tuple against the contents of all address registers. In a multiprocessor embodiment, the processing unit responsible for memory disambiguation receives all asynchronous store requests issued by other processors, and invalidates all out-of-order load operations which interfere with such store requests. Thus, if the (address,size) tuple in the corresponding register matches another (address,size) tuple in another register, then the corresponding address register is marked as invalid. A special commit instruction is executed at the in-order point, which checks whether the associated address register is valid; if so, then the datum loaded out-of-order and the datum in memory are coherent. On the other hand, if the address register is invalid, then the datum loaded out-of-order and the memory contents are not coherent. Thus, the load operation as well as any other operation dependent therefrom must be re-executed. A trap is invoked at that time, transferring execution control to recovery code produced by the compiler which re-executes the load operation as well as the dependent operations.

3. Problems with the State of the Art

Current strategies (for both static and dynamic out-of-order execution) deal with write serialization by performing operations out-of-order combined with a scheme (either implemented in software or hardware) for detecting interference. Once interference is detected, these schemes will cause the processor to re-execute the interfering out-of-order load operation and all dependent operations, so as to enforce write serial behavior by executing interfering instructions in-order.

This consumes valuable issue bandwidth so that, overall, the execution of fewer instructions can be completed. In addition, a mechanism has to be provided to re-execute the code. In the case of static scheduling, a code fragment containing the checking code, the out-of-order load instruction and its dependent code is placed in the program text again—with all the code size and instruction cache performance penalties that such placements imply. Alternatively, in the case of dynamic execution, the instructions are kept in the reissue buffer and dispatched again.

The following code fragment shows how the same code is placed in the program code twice in the statically generated schedule with out-of-order access to *Y as generated by a typical compiler (the duplicated code portion is indicated by '*' and the checking code by '+'):

```
t=*y
v=t+8
s=*(X+a*4+5)
u=s+4
if (Y==(X+a*4+5))/*compare addresses*/+
    t=(*Y)*
    v=t+8*
endif+
```

As can be seen from this example, for static code generation the code size penalty is quite severe.

With respect to processors using dynamically generated instruction schedules (e.g., superscalar processors), these processors need logic to communicate the decision to re-execute the instructions to the issue buffer, and to invalidate previous entries in the renamed register table.

Additional penalties for achievable performance arise because both mechanisms have to re-execute previously executed instructions when interference is detected. Thus, both approaches suffer in performance from having to re-execute the instruction stream by using issue slots which could be used for execution of other instructions. From the previous discussion, it follows that re-execution is not an efficient method to correct interference in the case of reordered memory read references (i.e., re-execute the load operation and all dependent operations once a violating situation has been detected).

SUMMARY OF THE INVENTION

The problems stated above, as well as other related problems of the prior art, are solved by the present invention, a method and apparatus for reordering memory operations in a processor.

In one aspect of the invention, a method for scheduling instructions for execution in a computer processing system implementing out-of-order execution, comprises the steps of:

selecting and moving a next instruction from its current position in a sequence of instructions to an earlier position;

determining whether the selected instruction may reference a memory location for read-access;

determining whether non-selected instructions, which may ambiguously reference the memory location for read-access, were previously moved over the selected instruction, when the selected instruction may reference the memory location for read-access;

establishing a bypass sequence to be performed during an execution of the selected instruction and which passes data previously read-accessed by the non-selected instructions to the selected instruction, when the non-selected instructions were previously moved over the selected instruction and addresses of memory locations from which the non-selected instructions have read-accessed the data are the same as an address of the memory location from which the selected instruction is to read-access data;

determining whether the selected instruction was previously moved over the non-selected instructions, when the selected instruction may reference the memory location for read-access; and adding a mechanism for storing a record of the selected instruction for future reference by the non-selected instructions.

In another aspect of the invention, a method for enforcing consistency between data values obtained during multiple read-accesses from a memory location in a computer processing system wherein sequences of instructions are executed by at least one processor unit, the multiple read-accesses initiated by an out-of-order load instruction and at least one other load instruction, comprises the steps of:

executing the out-of-order load instruction to control the at least one processor unit to at least read-access a first datum from the memory location identified by the out-of order load instruction;

creating a record of the out-of-order load instruction for use by the at least one other load instruction, wherein the record includes an address of the memory location from which the first datum was loaded and a value associated with the first datum; and executing the at least one other load instruction and controlling the at least one processor unit during the executing of the at least one other load instruction to perform the following steps:

determining whether the address of the memory location from which the out-of-order instruction loaded the first datum is overlapping or the same as an address from which the at least one other load instruction is to load a datum; and passing the first datum or a portion thereof from the record to the at least one other load instruction, when the addresses are the same or overlapping, respectively.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
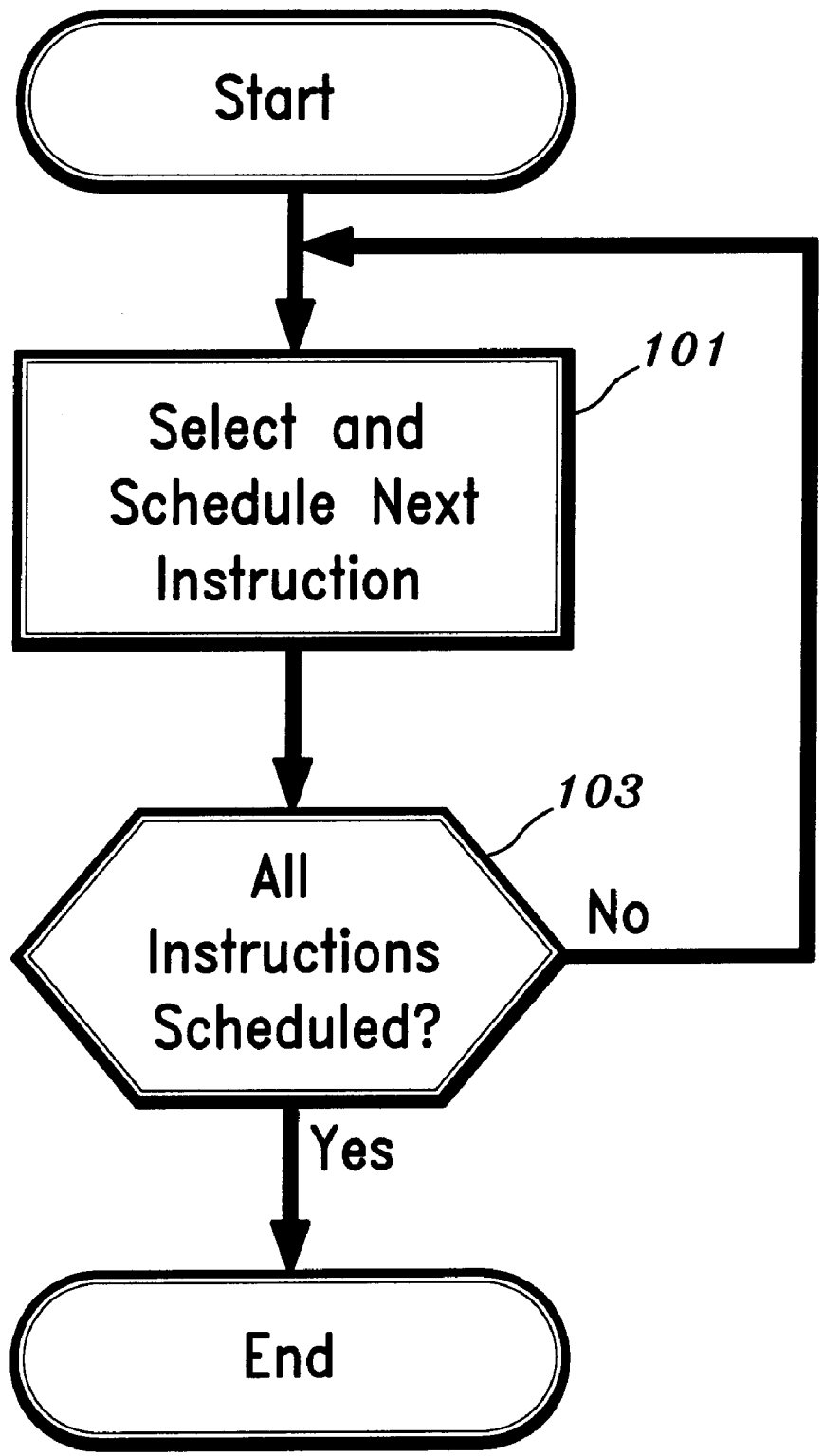
FIG. 1 is a flow diagram illustrating the scheduling of instructions when reordering of operations other than memory operations is performed, according to the prior art.

The present invention is directed to methods and apparatus for reordering load operations in a computer processing system. In such a computer processing system sequences of instructions are stored in a memory for execution by at least one processor unit. The invention is applicable to operations reordered when the program is generated (static reordering) as well as to operations reordered at execution time (dynamic reordering). Further, the invention is suitable for software and/or hardware based implementations and, is applicable in uniprocessor (e.g., in a system with peripheral devices which directly access main memory) and multiprocessor systems.

To facilitate a clear understanding of the present invention, definitions of terms employed herein will now be given. A load instruction refers to any instruction performing a memory read-access and (optionally) computations based on the loaded value. Thus, a load instruction may include, for example, logic, arithmetic and other instructions which employ data from memory locations as operands. Out-of-order execution is a technique by which the operations in a sequential stream of instructions are reordered so that operations appearing later are executed earlier, if the resources required by the later appearing operations are free. Thus, an out-of-order load instruction may be created, either statically or dynamically, by moving a load instruction from its original position in a sequence of instructions to an earlier position in the sequence of instructions. Such out-of-order load instruction identifies a location in memory from which to read a datum, and a first destination register in which to place the datum. An ambiguous memory reference refers to the case when a memory load operation appears after another memory load operation in a sequential instruction stream, and it is not possible to determine ahead of time whether the memory locations to be accessed by the two memory load operations are different. A speculative operation is an out-of-order operation that may not necessarily be executed because, for example, the execution path in which it is located may not be followed but rather, another execution path may be followed instead.

The following description and corresponding examples will be given based on two instructions (unless otherwise noted), a first instruction which is executed out-of-order before a second, logically preceding instruction, which will be termed an in-order instruction. Thus, unless otherwise noted, the designation 'in-order' refers only to the sequential relationship between the logically preceding in-order instruction and the first 'out-of-order' instruction. However, it is to be appreciated that the invention can be easily extended to cover multiple out-of-order and in-order load operations by anyone skilled in the art. It is to be noted that the above two instructions (i.e., both the in-order and the out-of-order load instructions) may be in-order or out-of-order with respect to a third instruction (and so forth).

A general description of the present invention will now be provided to introduce the reader to the concepts of the invention. Subsequently, more detailed descriptions of various aspects of the invention will be provided.

Thus, stated generally, the present invention may be implemented in various methods and apparatus that utilize data bypassing to enforce consistency among multiple memory accesses to the same location, so that the resultant data sequence presented to a program executing on the processor is consistent with the data sequence present in the memory location (i.e., if the instructions were executed in their original program order, then it would have been possible for the program to perceive such a data sequence). More specifically, the method consists of an interference test which controls the processor unit to compare the address from which logically preceding in-order load operations read data with those addresses which have been accessed in a speculative fashion by out-of-order load instructions which succeed the in-order instructions in logical program order. If the addresses match, then the in-order load instruction which logically precedes the out-of-order load instruction is presented with the same datum as was provided to the speculatively executing out-of-order load instruction.

Bypassing data from an out-of-order load instruction to an in-order load instruction avoids the need to re-execute the out-of-order load instruction and its dependent instructions, while maintaining write serialized program execution.

We refer to the previous example to show the effect of using the bypassing mechanism according to the present invention. The instruction stream on the left side shows a re-ordered program stream as would be generated for a dual-issue uni-processor. The bypassing mechanism of the present invention is used to pass data from the interfering out-of-order load (indicated by '*') to the in-order load (indicated by '+') for the program shown on the left side. The execution of this re-ordered program (left side) is equivalent to the execution of the in-order program as specified on the right side of the following example, and is thus a correct write-serial execution:

| Reordered code with bypassing | | Equivalent to in-order execution | |
|---|---|---|---|
| -- second processor writes datum d1 to memory referenced by load into s and t -- | | | |
| | mul r10, r1, 4 | mul | r10, r1, r4 |
| * | load r5, (r9) | add | r11, r10, 5 |
| | add r1, r10, 5 | add | r12, r11, r2 |
| | | load | r4, (r12) |
| | | add | r6, r4, 4 |
| | | load | r5, (r9) |
| -- second processor modifies datum to d2 -- | | | |
| | add r12, r11, r2 | add | r7, r5, r8 |
| + | add r7, r5, 8 | | |
| | load r4, (r12) | | |
| | add r6, r4, 4 | | |

The interference test and bypassing logic of the present invention may be implemented by: hardware resources in the processor; instructions executed by the processor; or a hybrid hardware/software scheme. In the case of a software implementation, the interference test may consist of a new single instruction, or may be composed of existing instructions (such as a load instruction and a compare and conditional move instruction, or a load instruction, a compare instruction, a branch instruction and a move instruction). The specific implementation of the interference test is dependent on whether reordering of memory operations is performed statically or dynamically. The addresses and datum values provided to out-of-order load operations may be stored in either main memory as normal data values, or in a hardware table structure embedded in the processor which may or may not be explicitly accessible from instructions in the instruction stream. The proposed scheme can be combined with schemes for detecting load/store interference, and for re-issuing some load operations upon detection of interference to implement different memory consistency models. In such a case, one or more of the resources required for these schemes can be combined with the load result bypassing resources to reduce hardware complexity in a generalized out-of-order execution scheme.

Referring now to FIG. 1, there is shown a flow diagram illustrating the scheduling of instructions according to the prior art, when reordering of operations other than memory operations is performed either statically or dynamically. Reordering is performed according to the method of FIG. 1 only if such reordering is not subject to ambiguities.

In step 101, the next instruction is selected and moved from its current position in the sequential stream of instructions to an earlier position (i.e., the instruction is "scheduled" for execution), if such a movement is advantageous and does not affect the proper operation of the program. That is, the selected instruction is moved to an earlier position if the instruction does not depend on any of the instructions over which it is moved.

In step 103, it is determined whether there are instructions left to be scheduled. If so, then the process returns to step 101. Otherwise, the process terminates.

Figure 2A:
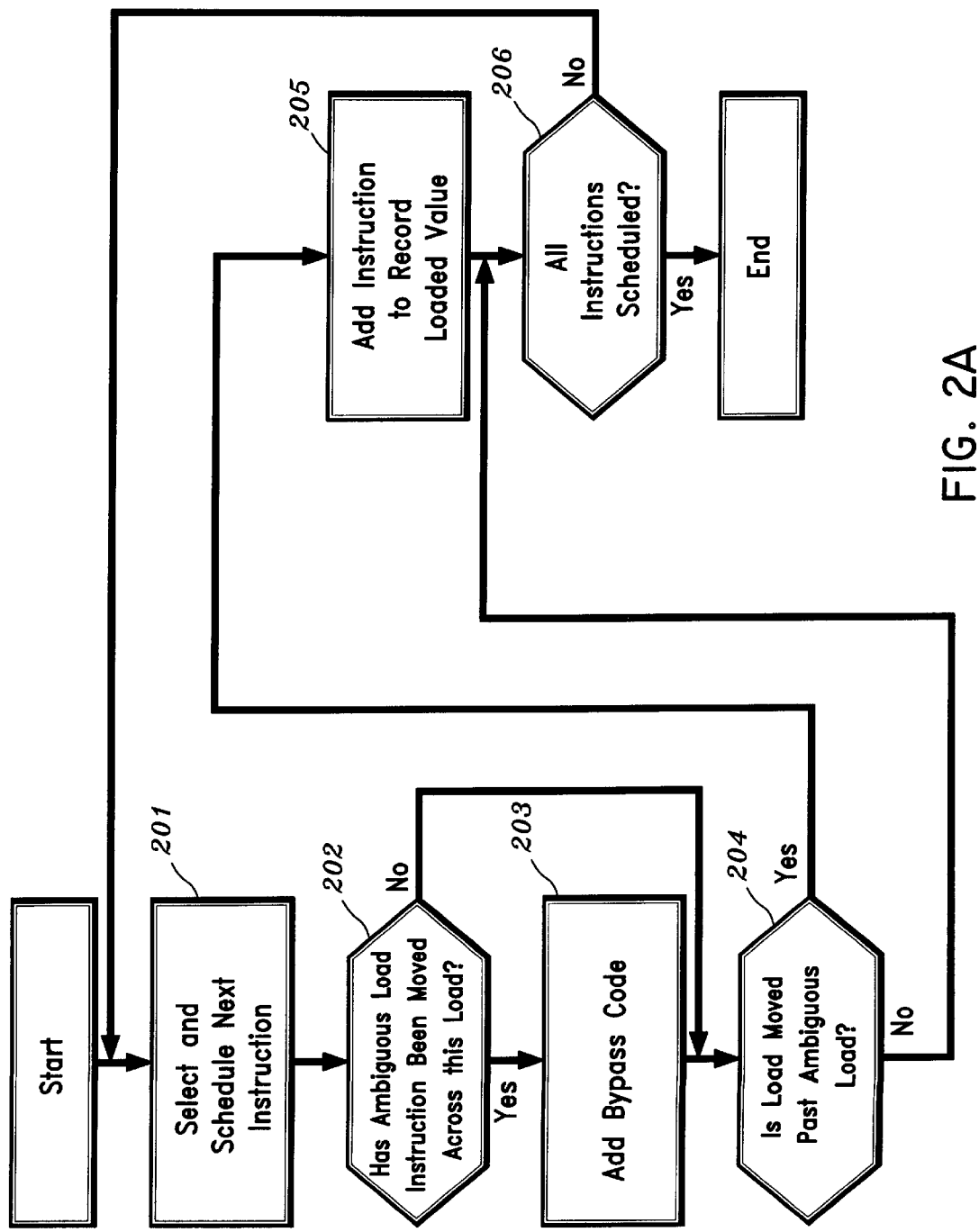
FIG. 2A is a flow diagram illustrating a process for reordering operations from an original sequence of instructions, according to an embodiment of the present invention.

FIG. 2A is a flow diagram illustrating a process for reordering operations from an original sequence of instructions, according to an embodiment of the present invention. In particular, FIG. 2A depicts how any scheduling technique can be extended to handle disambiguation according to the present invention. Note that this general scheme is applicable to all techniques that implement disambiguation (i.e., either static or dynamic). The specific algorithm given here is based on the assumption that each scheduled instruction will be executed after all previously scheduled instructions (i.e., the selection order mirrors the execution order). However, a person skilled in the art will understand how to modify the details of this algorithm for use with other scheduling approaches.

In step 201, the next instruction is selected and moved from its current position in the sequential stream of instructions to an earlier position (i.e., the instruction is scheduled for execution).

In step 202, it is determined whether the selected instruction was a load (or any other instruction which may reference a memory location for read-access). If so, it is further determined in step 202 whether a non-selected instruction, which may ambiguously reference the same memory location (such as a non-selected load instruction or any other instruction which may reference a memory location for read-access), was previously moved over the selected load instruction. The second determination made in step 202 may also be characterized as whether the selected (i.e., present) instruction is an in-order instruction with respect to one or more out-of-order instructions. If either of the results of the two determinations made in step 202 is false, then the process continues to step 204. However, if it was determined in step 202 that the selected instruction was a load instruction and further, that a non-selected operation, which may ambiguously reference the same memory location, was moved over the selected load instruction, then the process continues to step 203.

In step 203, actions dealing with disambiguation are performed. These include, but are not restricted to: adding a test for determining whether there exists interference between load instructions which are out-of-order with respect to the selected load instruction (i.e., interference by load instructions which were moved over the selected load instruction); and setting up a bypass sequence which will execute in the case of such interference. This bypass sequence shall enforce a correct time-sequential (write-serial) order of events by ensuring that the selected in-order load instruction will return the same value as the previous out-of-order load sequence. The bypassing sequence will check on multiple bypass conditions if multiple (out-of-order) load operations have been moved over the selected load instruction. The checking step performed during the bypass sequence may be implemented by hardware means, a flag or other means encoded in the load instruction, an additional instruction, or a sequence of additional instructions.

If multiple checks are performed, then they are to be executed so as to ensure that the final result is write serial with respect to the referenced memory location. To ensure this, if multiple interfering load instructions are executed out-of-order with respect to the selected in-order load instruction, then the value has to be bypassed from the record of the earliest logical successor out-of-order load instruction which interferes. Preferably, this is performed using one of the two methods. In the first method, interference and bypassing tests are performed in logical program order and once an interference has been detected, all further tests and bypassing for the particular atomic unit (if multiple atomic units are referenced in a load operation) are skipped.

In the second method, the interference tests and bypassing are performed in reverse logical program order. It is to be appreciated that both methods guarantee write serial behavior. It is to be further appreciated that, based on the teachings of the two methods, a person skilled in the art will be able to make various changes and modifications thereto without departing from the spirit or scope of the invention.

In step 204, it is determined whether the selected instruction was a load and, if so, it is further determined whether the selected instruction was previously moved over another non-selected instruction which may ambiguously reference the same memory location (such as a non-selected load instruction or any other instruction which may reference a memory location for read-access). The two determinations made in step 204 may also be characterized as whether the selected instruction is an out-of-order load instruction with respect to one or more in-order instructions. If the result of either of the two determinations made in step 204 is false, then the process continues to step 206. However, if it was determined in step 204 that the selected instruction was a load instruction and further, that the selected instruction was previously moved over an other non-selected instruction which may ambiguously reference the same memory location, then the process continues to step 205.

In step 205, a mechanism is added to record the result of the out-of-order load instruction for future reference by all in-order load instructions over which this load instruction was moved. The mechanism to record such operation may consist of a hardware means, a "flag" (instruction bit) or other means encoded in the load instruction, an additional instruction, or a sequence of additional instructions. If necessary, additional code for removing such record (and reclaim whatever resources were required to store such information) may be inserted in the original program location of the moved load operation.

In step 206, it is determined whether there are instructions left to be scheduled. If so, then the process returns to step 201. Otherwise, the process terminates.

Figure 2B:
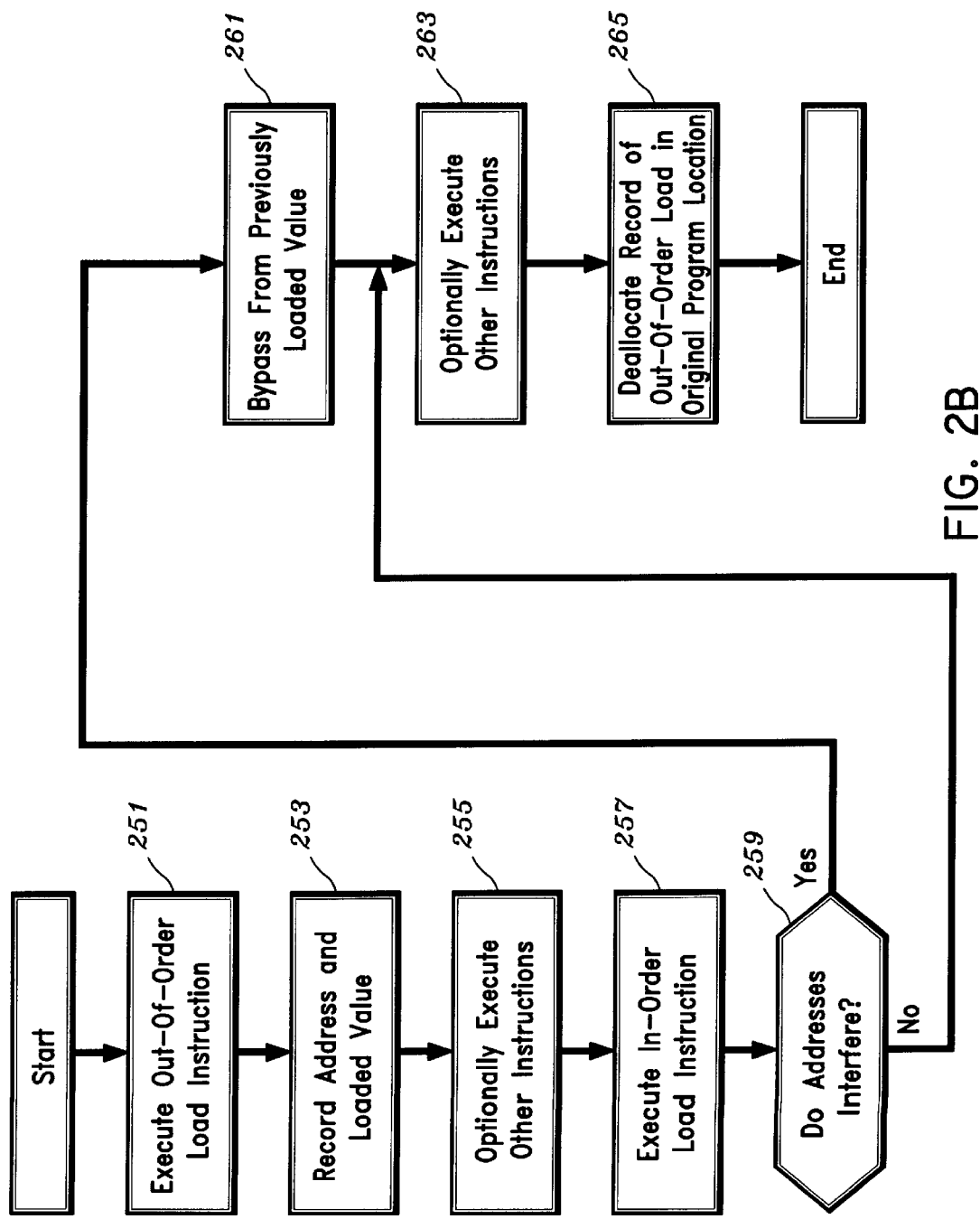
FIG. 2B is a flow diagram illustrating a process for executing the reordered operations of FIG. 2A.

FIG. 2B is a flow diagram illustrating a process for executing the reordered operations of FIG. 2A. In particular, FIG. 2B provides a more detailed description of the bypassing and recording steps of FIG. 2A.

In step 251, an out-of-order load instruction is executed, thereby reading a datum and storing the datum in the register specified in the out-of-order load instruction. In step 253, the address and the value loaded by the load instruction is recorded for future reference. In step 255, other instructions, including instructions depending on the value loaded in step 253, may be optionally executed.

In step 257, an in-order load instruction, over which the previous out-of-order load instruction executed in step 251 has been moved, is executed. In step 259, a check is performed to determined whether the addresses of the two load instructions interfere. If the addresses interfere, then the process continues to step 261. However, if the addresses do not interfere, then the process continues to step 263.

In step 261, the load value from the previous out-of-order load operation is bypassed, so that the datum value that was provided to (loaded by) the out-of-order load is n now provided to (loaded by) the in-order load.

In step 263, other instructions may be executed, including instructions dependent on either (or both) of the load instructions or independent instructions. In step 265, at the location of the original load instruction which has been performed out-of-order, the entry for the load record allocated in step 253 is deallocated.

Note that if several load instructions are moved over another load instruction, then several checks are performed (as necessary) by repeating steps 259 and 261 for each load instruction which was moved out-of-order with respect to the in-order load instruction. Furthermore, if an instruction is both an in-order instruction with respect to some out-of-order instructions and an out-of-order instruction with respect to some in-order instructions, then the bypassing step 261 is preferably performed before the recording step 253.

As an optimization to the above process, step 257 can be reordered such that an in-order memory access is only performed if no interference is detected.

The present approach can be used in static and dynamic schemes. These implementations may use different approaches for identifying whether two operations are in-order or out-of-order with respect to each other, and how references are created and referenced.

One way to identify an in-order/out-of-order relationship between any two load operations is by assigning identifiers to out-of-order load operations which may then be used by the in-order load operation's interference and bypass test to identify the operations which are out-of-order with respect to such in-order operations in the program flow. These identifiers can either by statically assigned by the compiler, or dynamically created by the issue hardware.

It is to be appreciated that while the invention has been described in terms of memory words, it may also be applied to memory structures with various organizational forms including, but not limited to, bit and byte addressable memory. Moreover, memory operations may specify that memory words are partially overlapping (i.e., that only a subset of the bits referenced by two memory words are common to these words). In such a case, only those common bits would be bypassed. Further, a memory system can specify atomicity requirements for memory accesses. In such a case, the appropriate atomic unit (typically a byte, word or cache line) would be recorded by the out-of-order load instruction to be bypassed to the in-order load instruction. Additionally, other modifications can be made to this invention for use with different memory models, while preserving the spirit and scope of this invention.

EMBODIMENT USING STATIC SCHEDULING AND INSTRUCTIONS FOR THE INTERFERENCE TEST AND DATA BYPASSING

In order to illustrate possible implementations of the interference test of the present invention using static scheduling and instructions, examples are provided hereinbelow wherein the desired functionality of the interference test is implemented at the word level. However, it is to be appreciated that processors which implement memory read operations at the bit, byte, half-word or any other level can also be adapted to use the methods described herein. Comparisons are then to be carried out for each separately addressable unit independently, with the potential for bypassing from different entries for each unit of addressability. A system may further guarantee atomicity at the byte, half-word, word cache line (or a higher) level. If such atomicity is to be preserved, then the present invention can be adapted to record the surrounding atomic unit in the record generated by an out-of-order instruction.

The examples provided herein utilize the following notation:

RT, RA identify general purpose registers;

(RT), (RA) are the contents of general-purpose registers RT and RA, respectively;

D, BD are a data displacement and a branch displacement, respectively; and

CIA, NIA are the addresses of the instruction currently being executed and the next instruction to be executed, respectively.

Unless otherwise noted, pseudo code uses operators similar to those specified for the C programming language by the ISO C standard, e.g., the notation [ ] to specify an index, and the . (dot) to specify a record field.

One exemplary implementation of static scheduling uses a load-tag identifier which is assigned to each out-of-order load operation by the compiler. The load-tag identifier is uniquely associated with a single out-of-order load operation as between the out-of-order issue point of that load operation and the logical in-order point for such operation.

The load-tag identifier is stored in each out-of-order load instruction word, and recorded in the record created by step 253 in FIG. 2B. Such out-of-order load instruction will contain one additional field in its instruction format, and an out-of-order load instruction with load-tag identifier 4 will be written hereafter as: load_4 RT, D(RA).

In addition to performing the load, this operation will record the load result (the largest atomic unit which contains this access to guarantee atomicity), the load-tag identifier and the address in a table.

An instruction denoted dealloc__4 will deallocate the table entry with load-tag id 4 as shown in step 265 in FIG. 2B. The dealloc__n operation is an optional step of the process of FIG. 2B. Thus, depending on the specific implementation, the dealloc__n operation may be omitted from the code and table entries may be superseded automatically by a later allocation request.

One efficient implementation consists of using this load-tag identifier as an actual index in the table used to record information about out-of-order load results. The interference test for the bypass condition and the actual bypass step can then be implemented using a 'check address interference and conditional load register' instruction, whose definition is given below. This instruction specifies an out-of-order load with which to compare addresses and whose results to bypass in the case of address interference.

Address interference is detected when the address (from which the previously executed out-of-order load instruction loaded data) matches (or overlaps, for sub-word operations) the currently specified address (in the in-order load instruction). Preferably, address interference is detected in accordance with the following instruction:

Check address interference and conditional load register
chkld__n RT, D(RA)
EA<=(RA)+D
if (entry[n].address==EA)
; bypass if addresses interfere
RT<=entry[n].value wherein EA is the effective memory address referenced by the in-order instruction. If the computed effective address matches or overlaps the memory area of the previously executed out-of-order load which is recorded in the entry specified by the chkld instruction (n), then the corresponding value is bypassed.

The chkld instruction essentially implements steps 259 and 261 in a single instruction.

Note that the chkld instruction can be combined with an actual load instruction to combine steps 257, 259, and 261 in a single operation load with check:

load__chk__n RT, D(RA)
EA<=(RA)+D
if (entry[n].address==EA)
; bypass if addresses interfere
RT<=entry[n].value
else
RT<=MEM(EA,4)

Alternatively, it may be desirable to only use a test address interference and branch instruction, which tests for address interference of two memory addresses and their associated sizes and branches in the case of overlap to speed software-based interference and bypassing tests.

In order to illustrate the static generation of the interference test and bypass operation of the present invention (the check address interference and conditional load register instruction (chkld)) and its execution, consider the (original) code shown below in the left-hand column which contains a second load instruction below a first load instruction, and some arithmetic instructions that depend on the second load instruction. In this example, the first register after the name of the instruction is the target register, whereas the remaining registers are the operands.

| Original Code | | | Load Instruction Moved Over In-Order Load Instruction | |
|---|---|---|---|---|
| ... | | | load__3 | r5, 10 (r4) |
| ... | | | ... | |
| ... | | | ... | |
| load | r3, 20 (r2) | | load | r3, 20 (r2) |
| | | | chkld__3 | r3, 20 (r2) |
| ... | | | ... | |
| load | r5, 10 (r4) | | dealloc__3 | |
| add | r6, r5, 20 | | add | r6, r5, 20 |
| sub | r7, r6, r7 | | sub | r7, r6, r7 |
| $next: | ... | | $next: | ... |

The second load instruction is moved over the first load instruction, as depicted in the right-hand column. The in-order load instruction is augmented by a check address interference and conditional load register instruction (chkld), and the original second load instruction (which was moved out-of-order) is replaced by an instruction to deallocate the bypass record, as shown in the right-hand column. The arithmetic instructions that follow the original load instruction may also be reordered, as shown below:

| Original Code | | | Operations Moved Over In-Order Load Instruction | |
|---|---|---|---|---|
| ... | | | load__3 | r5, 10 (r4) |
| ... | | | add | r6, r5, 20 |
| ... | | | sub | r7, r6, r7 |
| ... | | | ... | |
| load | r3, 20 (r2) | | load | r3, 20 (r2) |
| | | | chkld__3 | r3, 20 (r2) |
| ... | | | ... | |
| load | r5, 10 (r4) | | dealloc__3 | |
| add | r6, r5, 20 | $next: | ... | |
| sub | r7, r6, r7 | | | |
| $next: | ... | | | |

In this case, the instructions that depend on the load operation are also moved over the in-order load instruction, as shown in the right-hand column.

Using the combined load and check instruction (load__chk__n) will collapse instructions load and chkld into a single operation, as shown below:

| Original Code | | | Operations Moved Over In-Order Load Instruction | |
|---|---|---|---|---|
| ... | | | load__3 | r5, 10 (r4) |
| ... | | | add | r6, r5, 20 |
| ... | | | sub | r7, r6, r7 |
| ... | | | ... | |
| load | r3, 20 (r2) | | load__chk__3 | r3, 20 (r2) |
| ... | | | ... | |
| load | r5, 10 (r4) | | dealloc__3 | |
| add | r6, r5, 20 | $next: | ... | |
| sub | r7, r6, r7 | | | |
| $next: | ... | | | |

Figure 3:
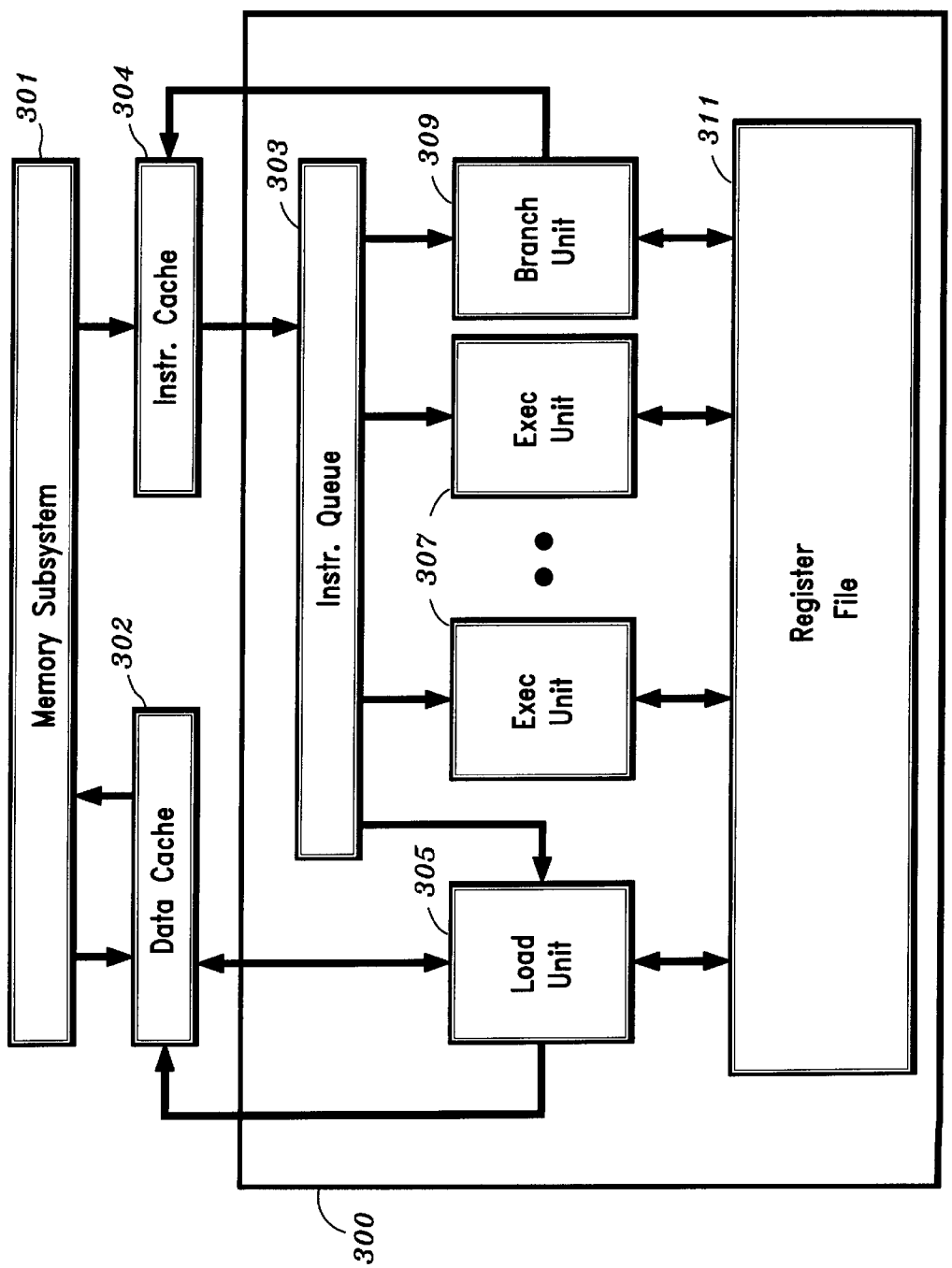
FIG. 3 is a functional block diagram of a conventional computer processing system that supports static reordering of memory operations and software-based implementations of the interference test and data bypass sequence.

FIG. 3 is a functional block diagram of a conventional computer processing system that supports static reordering of memory operations and software-based implementations of the interference test and data bypass sequence. The system consists of: a memory subsystem 301; a data cache 302; an instruction cache 304; and a processor unit 300. The processor unit 300 includes: an instruction queue 303; one or more load units 305 (one shown); several execution units 307 for performing integer, logic and floating-point operations; a branch unit 309; and a register file 311. Instructions are fetched from instruction cache 304 (or from memory subsystem 301, when the instructions are not in instruction cache 304) under the control of branch unit 309, and are placed in instruction queue 303. Instructions are dispatched for execution from instruction queue 303 to load unit(s) 305, execution units 307 and branch unit 309. These units (305, 307, 309) interact with register file 311 to access the operands used by the instructions and to save the results produced by the execution of the instructions. The register file 311 typically includes general-purpose registers (GPRs), floating-point registers (FPRs), and condition registers (CRs). The load unit(s) 305 also interacts with data cache 302 and memory subsystem 301, to load data used by the instructions that are executed by execution units 307 and/or branch unit 309, and to store results generated by the execution units.

Figure 4:
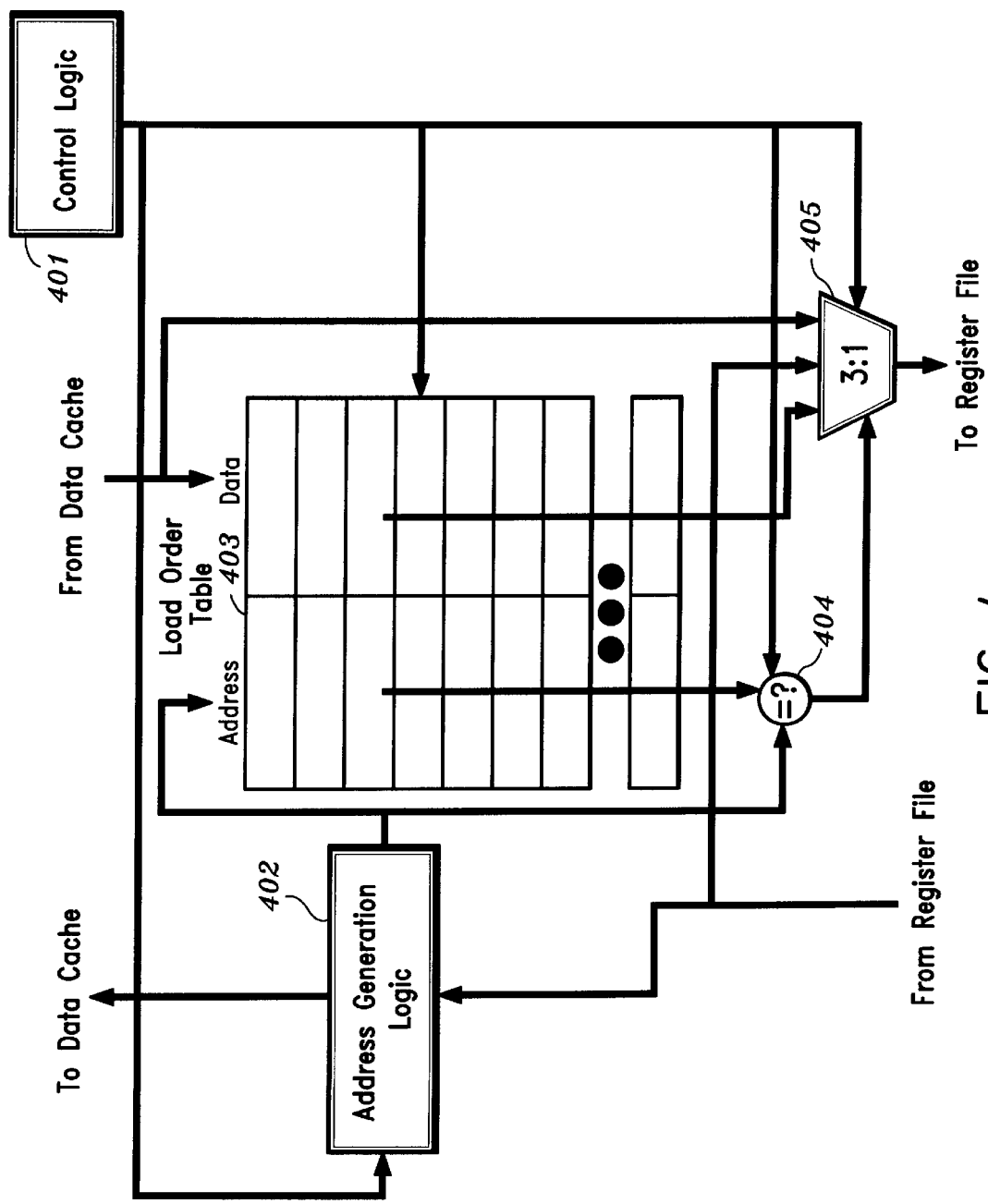
FIG. 4 is a block diagram illustrating the hardware resources used for supporting the execution of out-of-order load operations by the system of FIG. 3, according to an embodiment of the present invention.

FIG. 4 is a block diagram illustrating the hardware resources used for supporting the execution of out-of-order load operations by the system of FIG. 3, according to an embodiment of the present invention. More particularly, FIG. 4 is a detailed block diagram of at least one load unit 305 shown in FIG. 3. The at least one load unit 305 includes: control logic 401; address generation logic 402; load-order buffer 403; comparison logic 404; and a data selection mechanism for bypassing 405.

In a first mode of operation, when processing a regular load instruction, the address generation logic 402 generates a memory address from which to read a datum. Depending upon the specific format of the load instruction, the memory address may be generated based on operand(s) read from a register(s) of register file 311 as specified in the load instruction, or may be generated based on operand(s) read from a register(s) of register file 311 and displacement information as specified in the load instruction. The address generation logic 402 then forwards the generated memory address to data cache 302. The requested datum is read from data cache 302 or from memory subsystem 301 (if not present in data cache 302), and then returned and written to the destination register in register file 311 through selection mechanism 405, which is controlled by control logic 401.

In a second mode of operation, when processing an out-of-order load instruction, address generation logic 402 generates a memory address from which to read a datum. Depending upon the specific format of the load instruction, the memory address may be generated based on operand(s) read from a register(s) of register file 311 as specified in the load instruction, or may be generated based on operand(s) read from a register(s) of register file 311 and displacement information as specified in the load instruction. The address generation logic 402 then forwards the generated memory address to data cache 302. The requested datum is read from data cache 302 or from memory subsystem 301 (if not present in data cache 302), and then returned and written to the destination register in register file 311 through selection mechanism 405, which is controlled by control logic 401. At the same time, control logic 401 directs load-order buffer 403 to store a record consisting of the address the datum was loaded from, the data type (optional), the largest unit guaranteed to be atomic by the underlying architecture containing the requested datum, and the load tag identifier (stored implicitly in FIG. 4 as an index in the table (i.e., load-order buffer 403)).

In a third mode of operation, when processing the 'check address interference and conditional load register' instruction (interference test and bypass) of the present invention, address generation logic 402 generates a memory address from which to read a datum. Depending upon the specific format of the check address interference and conditional load register instruction, the memory address may be generated based on operand(s) read from a register(s) of register file 311 specified in the check address interference and conditional load register instruction, or may be generated based on operand(s) read from a register(s) of register file 311 and displacement information specified in the check address interference and conditional load register instruction.

The control logic 401 accesses the record associated with the load-tag identifier specified in the check address interference and conditional load register instruction and supplies the contained memory address to comparison logic 404. The address generation logic 402 then supplies the memory address generated as a result of the check address interference and conditional load register instruction to comparison logic 404, which then compares both addresses. When the addresses match or indicate a memory overlap, comparison logic 404 indicates this to data selection mechanism 405. In the case of address matching or overlap, the datum stored in the data field of the entry accessed in load-order buffer 403 will be supplied to register file 311 for writeback. That is, the datum originally supplied to the out-of-order load instruction (which was stored in load-order buffer 403) is now provided to the in-order load instruction. Otherwise, the value currently stored in register file 311 for the in-order load instruction will remain unchanged (i.e., no interference between the out-of-order load and the in-order load has been detected). Selection mechanism 405, under the control of control logic 401, can only select a subset of bits supplied by the bypass entry from load-order buffer 403 to be written to register file 311 for the in-order load. This would be appropriate for a partial overlap of interfering out-of-order and in-order instructions that is beyond the atomicity units of the memory system.

In a fourth mode of operation, the instruction dealloc_n is implemented to deallocate entries from load order buffer 403. This instruction is optional and thus, may be omitted if so desired.

The embodiment described above introduces one extra instruction for each load over which the out-of-order load instruction is moved (i.e., the check address interference and conditional load register instruction), and one instruction for each load instruction which is moved out-of-order with respect to one or more other load instructions (i.e., the dealloc instruction). Although this is overhead with respect to the original program, the cost compares favorably with previous mechanisms which use instructions (one or more) to detect a bypass condition, and then execute a recovery sequence when interference is detected. This sequence by the previous mechanisms requires both space to store code and time to execute the code, in addition to adverse instruction cache effects and restrictions that the presence of recovery code has placed on the register allocation mechanism. With respect to the present invention, since the decision to move a load operation out-of-order is made when the program is generated, the impact of the overhead can be weighted against the expected benefits of performing the move.

In another alternative embodiment, the information about previous out-of-order load operations in an array (e.g., load-order buffer 403) is used by a sequence of compare instructions (or the single memory overlap instruction described previously) to test for memory overlap, and then by a sequence of additional instructions to conditionally move the value stored in the array into the target register specified by the in-order load instruction in the case of address overlap. The additional instructions may include either a conditional move instruction, or a conditional branch instruction followed by a conditional move instruction, or any other instruction sequence having the effect of moving the value stored in the record created by the out-of-order load instruction into the target register specified by the in-order load instruction.

In yet another alternative embodiment, the present invention is used for scheduling instructions in acyclic code blocks (e.g., basic blocks or superblocks) with strictly ascending instruction addresses for successively executed instructions within a block. In such a case, the load-tag identifier specified by an out-of-order load instruction is the program counter location of the original load instruction in its logic program order. FIG. 6 is a block diagram illustrating the hardware resources used for supporting the execution of out-of-order load operations by the systems of FIGS. 3 or 5, according to an embodiment of the present invention. In particular, FIG. 6 may be considered a detailed block diagram of an implementation of load unit 305 shown in FIG. 3, according to an embodiment of the present invention. The load unit 305 includes: control logic 601; address generation logic 603; a load-order table 605; an interference test and priority encoder 607; a first data selection mechanism for bypassing 609; and a second data selection mechanism for bypassing 611.

When a speculative load instruction executes, load unit 305 records the memory address from which the data is to be loaded, the data value received from memory, and the logical program location of the speculative load instruction (instruction number) in a content-addressable table 605. The logical program location can be specified in many ways. For example, an additional instruction field encoded in the instruction, a special instruction prefix, or one or more additional computer instructions may be used.

When an in-order load instruction executes, load unit 305 performs a CAM access on the memory load address generated by address generation 603, checks if such an address has been previously accessed by an out-of-order load operation which has a higher program location (stored as an instruction number in table 605) than itself (in the case of an out-of-order load accessing this table, the logical program location of the load operation is used), and references the same memory location in an 'interference test and priority encoder' 607. If the memory load address generated by address generation unit 603 has been previously accessed by an out-of-order load operation, then it is established that the out-of-order load previously processed and the current load operation interfere, and bypassing is enabled from the data associated with the interfering entry in data selecting mechanism 611. Multiple entries may be present in table 605 associated with a particular memory address, of which more than one may be deemed to interfere. If multiple entries interfere with a load operation, then interference test and priority encoder 607 uses a priority encoding scheme to ensure that the datum is provided from the interfering entry with the lowest logic program address (stored as an instruction number in table 605) as specified originally by the out-of-order load instruction and stored in table 605.

Table entries are deallocated by control logic 601, when the program counter reaches the value of the original logical program order of the out-of-order load instruction.

This mechanism trades off program space for hardware complexity. As can be demonstrated, no additional instructions are needed to manage such an embodiment. Static scheduling should be implemented such that no load instructions are scheduled out-of-order which cannot be stored in table 605 due to insufficient memory capacity in that table. It is to be appreciated that while a content-addressable memory is the preferred implementation of table 605, a person skilled in the art will be able to contemplate other memory structures which serve a similar function as table 605 and maintain the spirit and scope of the invention.

EMBODIMENT USING DYNAMIC SCHEDULING AND HARDWARE RESOURCES FOR THE INTERFERENCE TEST AND DATA BYPASSING

A conventional implementation of a processor capable of dynamically scheduling instructions (an out-of-order issue processor) includes the following features:

1. A mechanism for issuing instructions out-of-order, which includes the ability to detect dependencies among the instructions, rename the registers used by an instruction, and detect the availability of the resources used by an instruction;
2. A mechanism for maintaining the out-of-order state of the processor, which reflects the effects of instructions as they are executed (out-of-order);
3. A mechanism for retiring instructions in program order, and simultaneously updating the in-order state with the effects of the instructions being retired; and
4. A mechanism for retiring an instruction in program order without updating the in-order state (effectively canceling the effects of the instruction being retired), and for resuming in-order execution of the program starting at the instruction being retired (which implies canceling all the effects present in the out-of-order state).

Mechanism 3 from the list above is used to retire instructions when the effects of the instructions being retired are correct. Alternatively, mechanism 4 is used whenever there is some abnormal condition resulting from the execution of the instruction being retired or from some external event.

Figure 5:
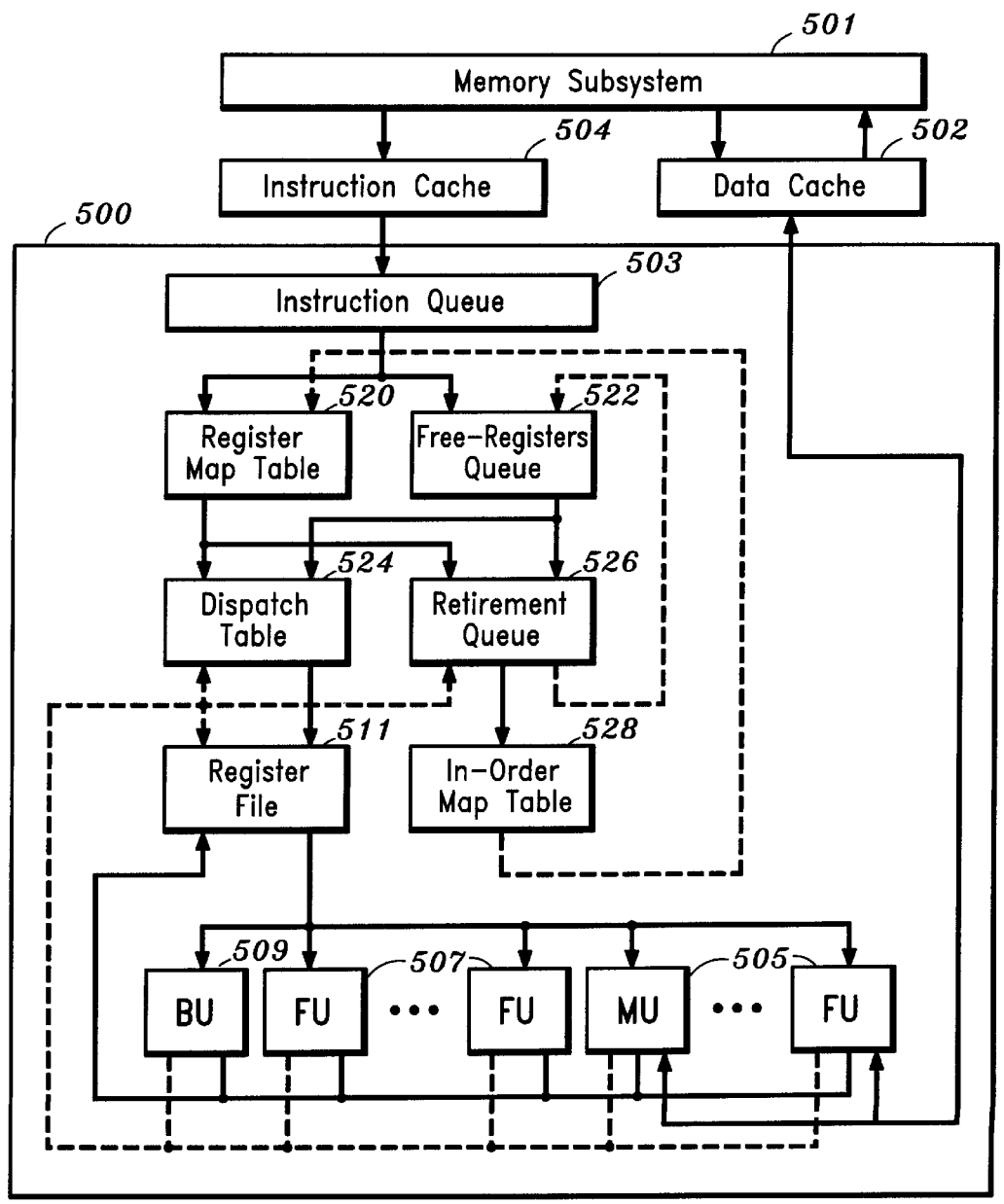
FIG. 5 is a functional block diagram of a conventional computer processing system that supports dynamic reordering of memory operations and hardware-based implementations of the interference test and data bypass sequence.
Figure 6:
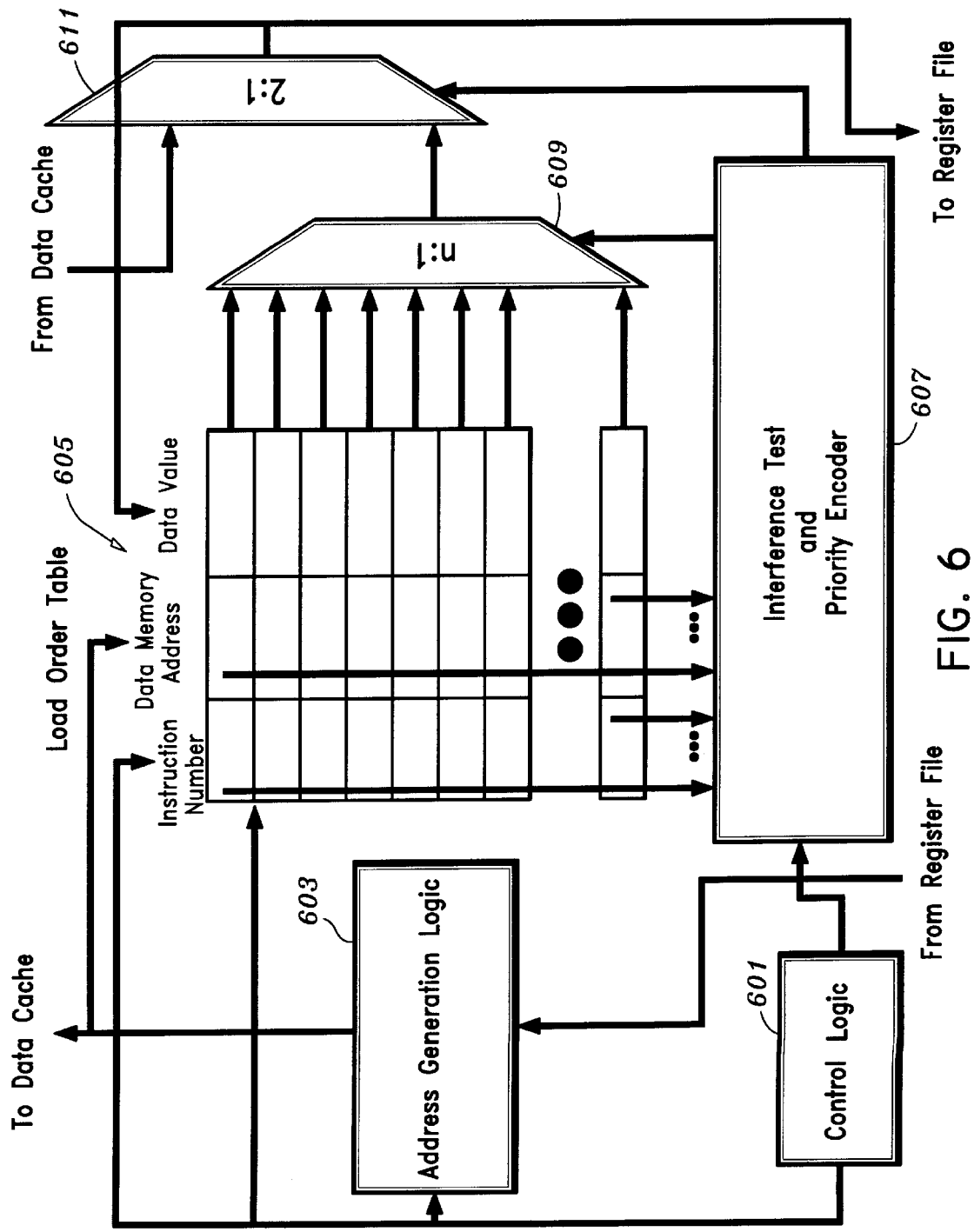
FIG. 6 is a block diagram illustrating the hardware resources used for supporting the execution of out-of-order load operations by the systems of FIGS. 3 or 5, according to an embodiment of the present invention.

FIG. 5 is a functional block diagram of a conventional computer processing system (e.g., including a superscalar processor) that supports dynamic reordering of memory operations and hardware-based implementations of the interference test and data bypass sequence. That is, the system of FIG. 5 includes the hardware resources necessary to support reordering of instructions using the mechanisms listed above, but does not include the hardware resources necessary to support the execution of out-of-order load operations before in-order load operations. The system consists of: a memory subsystem 501; a data cache 502; an instruction cache 504; and a processor unit 500. The processor unit 500 includes: an instruction queue 503; several memory units (MUs) 505 for performing load and store operations; several functional units (FUs) 507 for performing integer, logic and floating-point operations; a branch unit (BU) 509; a register file 511; a register map table 520; a free-registers queue 522; a dispatch table 524; a retirement queue 526; and an in-order map table 528. This exemplary organization is based on the one described in the article by M. Moudgill, K. Pingali, and S. Vassiliadis, "Register Renaming and Dynamic Speculation: An Alternative Approach", Proceedings of the 26th Annual International Symposium on Microarchitecture, pp. 202–13 (December 1993).

In the processor depicted in FIG. 5, instructions are fetched from instruction cache 504 (or from memory subsystem 501, when the instructions are not in instruction cache 504) under the control of branch unit 509, placed in instruction queue 503, and subsequently dispatched from instruction queue 503. The register names used by the instructions for specifying operands are renamed according to the contents of register map table 520, which specifies the current mapping from architected register names to physical registers. The architected register names used by the instructions for specifying the destinations for the results are assigned physical registers extracted from free-registers queue 522, which contains the names of physical registers not currently being used by the processor. The register map table 520 is updated with the assignments of physical registers to the architected destination register names specified by the instructions. Instructions with all their registers renamed are placed in dispatch table 524. Instructions are also placed in retirement queue 526, in program order, including their addresses, and their physical and architected register names. Instructions are dispatched from dispatch table 524 when all the resources to be used by such instructions are available (physical registers have been assigned the expected operands, and functional units are free). The operands used by the instruction are read from register file 511, which typically includes general-purpose registers (GPRs), floating-point registers (FPRs), and condition registers (CRs). Instructions are executed, potentially out-of-order, in a corresponding memory unit 505, functional unit 507 or branch unit 509. Upon completion of execution, the results from the instructions are placed in register file 511. Instructions in dispatch table 524 waiting for the physical registers set by the instructions completing execution are notified. The retirement queue 526 is notified of the instructions completing execution, including whether they raised any exceptions. Completed instructions are removed from retirement queue 526, in program order (from the head of the queue). At retirement time, if no exceptions were raised by an instruction, then in-order map table 528 is updated so that architected register names point to the physical registers in register file 511 containing the results from the instruction being retired; the previous register names from in-order map table 528 are returned to free-registers queue 522.

On the other hand, if an instruction has raised an exception, then program control is set to the address of the instruction being retired from retirement queue 526. Moreover, retirement queue 526 is cleared (flushed), thus canceling all unretired instructions. Further, the register map table 520 is set to the contents of in-order map table 528, and any register not in in-order map table 528 is added to free-registers queue 522.

In addition to the components above, superscalar processors may contain other components such as branch-history tables to predict the outcome of branches.

According to the present invention, a conventional superscalar processor that supports reordering of load instructions with respect to preceding load instructions (as shown in FIG. 5) may be augmented with the following:

1. A mechanism for marking load instructions which are issued out-of-order with respect to preceding load instructions;
2. A mechanism to number instructions as they are fetched, and determine whether an instruction occurred earlier or later in the instruction stream. An alternative mechanism may be substituted to determine whether an instruction occurred earlier or later with respect to another instruction;
3. A mechanism to store information about load operations which have been executed out-of-order, including their address in the program order, the address of their access, and the datum value read for the largest guaranteed atomic unit containing the loaded datum;
4. A mechanism for performing an interference test when a load instruction is executed in-order with respect to one or more out-of-order load instructions, and for performing priority encoding when multiple instructions interfere with a load operation;
5. A mechanism for bypassing the datum associated with an interfering load operation; and
6. A mechanism for deleting the record generated in step (3) at the point where the out-of-order state is retired from retirement queue 526 to register file 511 in program order.

The mechanisms provided by this invention are used in conjunction with the mechanisms available in the conventional out-of-order processor depicted in FIG. 5, as follows. Each instruction is numbered with an instruction number as it enters instruction queue 503. A load instruction may be dispatched from dispatch table 524 earlier than a preceding load instruction. Such a load instruction is denoted below as an 'out-of-order' load operation. In such a case, the entry in retirement queue 526 corresponding to the load instruction is marked as an out-of-order load.

The detection of the dispatching of an out-of-order load operation from dispatch table 524 to a memory unit 505 for execution is preferably accomplished with two counters, a "loads-fetched counter" and a "loads-dispatched counter". The loads-fetched counter is incremented when a load operation is added to dispatch table 524. The loads-dispatched counter is incremented when a load operation is sent to a memory unit 505 for execution. The current contents of the loads-fetched counter is attached to a load instruction when the load instruction is added to dispatch table 524. When the load instruction is dispatched from dispatch table 524 to a memory unit 505 for execution, if the value attached to the load instruction in dispatch table 524 is different from the contents of the loads-dispatched counter at that time, then the load instruction is identified as an out-of-order load operation. Note that the difference among the two counter values corresponds to the exact number of load operations with respect to which load instruction is being issued out-of-order. Out-of-order load instructions are only dispatched to a memory unit 505 if space for adding entries in load-order table 605 is available.

The load-order table 605 is a single table which is accessed by all memory units 505 simultaneously (i.e., only a single logical copy is maintained, although multiple physical copies may be maintained to speed up processing). Note that if multiple physical copies are used, then the logical contents of the multiple copies must always reflect the same state to all memory units 505.

The instruction number of the instruction being executed and the fact of whether an instruction is executed speculatively is communicated to memory unit 505 for each load operation issued.

FIG. 6 is a block diagram illustrating the hardware resources used for supporting the execution of out-of-order load operations by the system of FIG. 5, according to an embodiment of the present invention. More particularly, FIG. 6 is a detailed block diagram of memory unit 505 shown in FIG. 5. The memory unit 505 includes: control logic 601; address generation logic 603; a load-order table 605; an interference test and priority encoder 607; a first data selection mechanism for bypassing 609; and a second data selection mechanism for bypassing 611. The first data selection mechanism 609 being steered by interference test and priority encoding logic 607 is used to select the data value of the (logically) earliest interfering out-of-order load from load-order table 605. The second data selection mechanism 611 is used to select either the data returned by data cache 502 (or memory subsystem 501 in the case of a cache miss) or the data from load-order table 605. The data selected by second data selection mechanism 611 is used for future commitment to register file 511, depending on whether interference has been detected by interference test and priority encoding logic 607. It is to be appreciated that the functions performed by first and second data selection mechanisms 609, 611 may be integrated into a single data selection mechanism. The preferred implementation of load-order table 605 is a content addressable memory (CAM). However, one skilled in the art will appreciate that other memory structures which serve the substantially same purpose may be substituted therefore.

Upon receiving a load operation, an address is generated by address generation unit 603 and dispatched to data cache 502. Data cache 502 is then accessed to provide a datum. If the datum is not found in data cache 502, then memory subsystem 501 is accessed to provide the datum. At the same time, load-order table 605 is accessed by control logic 601 with the data address generated by address generation unit 603. The interference test and priority encoder 607 checks for interference, which is detected if an entry exists in load-order table 605 which references the same address as the current access of data cache 502 (or that of an atomic unit containing the address of the current address), and that record has associated therewith a later instruction number than the currently executing load instruction (i.e., the recorded load instruction is out-of-order with respect to the load instruction being currently processed). If interference is detected, then interference test and priority encoder unit 607 directs data selection mechanism 611 to pass information from load-order table 605 to register file 511, or from data cache 502 otherwise. In an optimized embodiment, if a bypassing condition is encountered, then access to data cache 502 or memory subsystem 501 can be suppressed.

If multiple matches are encountered, interference test and priority encoder 607 directs data selection mechanism 609 to select the table entry with the earliest instruction number (which is later than the number of the current instruction) as a bypass data source for data selection mechanism 611.

If the load operation which was executed is marked as out-of-order, then the data value supplied to register file 511, together with the instruction's logical program address and the data memory address, are recorded in an entry in load-order table 605. Note that load instructions can be in-order with respect to some out-of-order load instructions and out-of-order with respect to other in-order load instructions. Both parts of the bypassing and the recording logic may thus be exercised by a single instruction.

Upon retiring the result of an out-of-order load operation from retirement queue 526, an instruction or control signal is sent to memory unit 505 to remove the entry associated with the retired instruction (e.g., by naming the unique instruction number).

If a branch misprediction is encountered and one or more speculatively executed out-of-order load instructions are flushed from the retirement buffer, the appropriate entries in the bypass table structure of memory unit 505 according to the present invention will be removed at the same time.

Instruction numbers are used in this scheme to establish the order of instructions in a sequential (in-order) execution of the input program. The instruction number must be able to uniquely identify all operations which can be processed by the processor at any given time, and be useable to establish the relationship between any two instructions processed simultaneously by the processor at any given time. For example, instruction numbers may consist of a single number which is wide enough to encode at least twice as many instructions n as can be in-flight (processed) at any point in time in the processor. Modulo-arithmetic can then establish that any instruction with a number in the range of n–1 numbers preceding the current instruction number should logically precede the current instruction; instructions with a number in the range of n–1 numbers succeeding the current instruction number should logically succeed the current instruction.

Alternate numbering schemes may consist of using the instruction address and an additional branch-prefix for each taken branch. The branch-prefix can take any number of forms such as a modulo counter of a reference to a branch table. Alternative implementations of instruction numbering may refer to a hardware table which imposes an ordering on the instruction stream. This can be based on an existing hardware element such as retirement queue 526 or on a hardware mechanism implemented for the exclusive purpose of ordering instructions. Yet another alternative implementation may only count the load instructions according to the described scheme, e.g., by using the loads fetched counter value to number load operations.

An alternative embodiment of this invention may create load-order bypass table entries based on the memory addresses being accessed, instead of storing entries based on the instruction number. This embodiment eliminates the requirement for priority encoding in interference test and priority encoder 607, but causes additional bypass conditions between instructions which are in-order with respect to each other, but out-of-order with respect to a third load operation. Note that such execution is still write-serialized, although such behavior may not be desirable because it reduces the rate at which the value returned by the processor for a read to a given memory location is synchronized with the value stream presented by other processors.

Another embodiment of the invention may dynamically create and insert instructions in instruction queue 503. This embodiment dynamically generates an instruction schedule similar to that described above for the static embodiment of the interference test and data bypassing. Thus, the instructions executed by the processor are similar for the static and dynamic embodiment, the only difference being that the schedule is created by the processor at the execution time of the program for the dynamic embodiment and by the compiler for the static embodiment.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for scheduling instructions for execution in a computer processing system implementing out-of-order execution, the method comprising the steps of:

selecting and moving a next instruction from its current position in a sequence of instructions to an earlier position;

determining whether the selected instruction may reference a memory location for read-access;

determining whether non-selected instructions, which may ambiguously reference the memory location for read-access, were previously moved over the selected instruction, when the selected instruction may reference the memory location for read-access;

establishing a bypass sequence to be performed during an execution of the selected instruction and which passes data previously read-accessed by the non-selected instructions to the selected instruction, when the non-selected instructions were previously moved over the selected instruction and addresses of memory locations from which the non-selected instructions have read-accessed the data are the same as an address of the memory location from which the selected instruction is to read-access data;

determining whether the selected instruction was previously moved over the non-selected instructions, when the selected instruction may reference the memory location for read-access; and adding a mechanism for storing a record of the selected instruction for future reference by the non-selected instructions.

2. The method according to claim 1, wherein said adding step is performed when the selected instruction was previously moved over the non-selected instructions.

3. The method according to claim 1, wherein said adding step is performed when the non-selected instructions may ambiguously reference the memory location for read-access.

4. The method according to claim 1, further comprising the steps of:

determining whether there are instructions left to be selected; and returning to said selecting step, when there are instructions left to be selected.

5. The method according to claim 1, further comprising the step of:

assigning a load-tag identifier to a first instruction that has been previously moved over a different instruction, the load-tag identifier identifying the different instruction.

6. The method according to claim 5, wherein said step of determining whether the non-selected instructions were previously moved over the selected instruction comprises the steps of:

determining whether load-tag identifiers have been assigned to the non-selected instructions; and determining whether the load-tag identifiers identify the selected instruction.

7. The method according to claim 5, wherein said step of determining whether the selected instruction was previously moved over the non-selected instructions comprises the steps of:

determining whether load-tag identifiers have been assigned to the selected instruction; and determining whether the load-tag identifiers identify the non-selected instruction.

8. The method according to claim 5, further comprising the step of storing the load-tag identifier with an out-of-order load instruction word.

9. A method for scheduling instructions for execution in a computer processing system implementing out-of-order execution, the method comprising the steps of:

selecting and moving a next instruction from its current position in a sequence of instructions to an earlier position;

determining whether the selected instruction may reference a memory location for read-access;

determining whether the selected instruction is an in-order instruction with respect to non-selected instructions which may reference the memory location for read-access, when the selected instruction may reference the memory location for read-access;

establishing a bypass sequence to be performed during an execution of the selected instruction and which passes datums previously read-accessed by the non-selected instructions to the selected instruction, when the selected instruction is an in-order instruction with respect to the non-selected instructions and addresses of memory locations from which the non-selected instructions have read-accessed the datums are the same as an address of the memory location from which the selected instruction is to read-access a datum;

determining whether the selected instruction is an out-of-order instruction with respect to the non-selected instructions, when the selected instruction may reference the memory location for read-access;

adding a mechanism for storing a record of the selected instruction for future reference by the non-selected instructions, when the selected instruction is an out-of-order instruction with respect to the non-selected instructions.

10. The method according to claim 9, wherein said adding step is performed when the selected instruction is an out-of-order instruction with respect to the non-selected instructions.

11. The method according to claim 9, wherein said adding step is performed when the non-selected instructions may ambiguously reference the memory location for read-access.

12. The method according to claim 9, wherein the record comprises a memory address from which the selected instruction has read-accessed the datum, and a value associated with the datum.

13. The method according to claim 9, further comprising the step of:

assigning an identifier to each out-of-order instruction to identify the out-of-order instruction and those instructions which are in-order with respect to the out-of-order instruction.

14. The method according to claim 13, wherein the identifier is stored in an out-of-order instruction word.

15. The method according to claim 13, wherein the identifier is recorded in the record of the out-of-order instruction assigned thereto.

16. The method according to claim 13, further comprising the step of adding means for destroying the record of the out-of-order instruction, when the in-order instructions identified in the identifier assigned to the out-of-order instruction have been executed and determined to be non-interfering.

17. The method according to claim 9, wherein the record of the out-of-order instructions is arranged to be automatically superseded by a later allocation request.

18. The method according to claim 9, wherein a data unit stored in the record is a largest possible data unit guaranteeing atomicity.

19. The method according to claim 9, further comprising the step of implementing priority encoding to ensure that a datum having the lowest logic program address is passed to the in-order load instruction, when multiple out-of-order instructions reference the same address as the in-order instruction.

20. A method for enforcing consistency between data values obtained during multiple read-accesses from a memory location in a computer processing system wherein sequences of instructions are executed by at least one processor unit, the multiple read-accesses initiated by an out-of-order load instruction and at least one other load instruction, the method comprising the steps of:

executing the out-of-order load instruction to control the at least one processor unit to at least read-access a first datum from the memory location identified by the out-of order load instruction;

creating a record of the out-of-order load instruction for use by the at least one other load instruction, wherein the record includes an address of the memory location from which the first datum was loaded and a value associated with the first datum; and executing the at least one other load instruction and controlling the at least one processor unit during said executing of the at least one other load instruction to perform the following steps:

determining whether the address of the memory location from which the out-of-order instruction loaded the first datum is one of overlapping and the same as an address from which the at least one other load instruction is to load a datum; and passing one of the first datum and a portion thereof from the record to the at least one other load instruction, when the addresses are one of the same and overlapping, respectively.

21. The method according to claim 20, further comprising the step of destroying the record, when the processing unit reaches an original position of the out-of-order load instruction in the sequences of instructions.

22. The method according to claim 20, further comprising the step of adding means for removing the record, at an original position of the out-of-order load instruction in the sequence of instructions.

23. The method according to claim 20, further comprising the step of assigning an identifier to each out-of-order instruction to identify the out-of-order instruction and those instructions which are in-order with respect to the out-of-order instruction.

24. The method according to claim 20, wherein said step of executing the out-of-order load instruction further comprises the step of controlling the at least one processor unit to place the first datum in a first target register identified by the out-of-order instruction.

25. The method according to claim 20, wherein said determining and passing steps comprise a single instruction to be executed by the at least one processor unit.

26. An apparatus for enforcing consistency between data values obtained during multiple read-accesses from a location in a memory subsystem of a computer processing system, wherein sequences of instructions are executed by at least one processor unit, the multiple read-accesses initiated by at least one out-of-order load instruction and an in-order load instruction, the apparatus comprising:

storing means for storing a record of the at least one out-of-order load instruction, wherein the record comprises an address of the location in the memory subsystem from which a datum was read-accessed, and a value associated with the datum;

comparison logic for comparing the address of the location in the memory subsystem from which the at least one out-of-order load instruction read-accessed the datum with an address of the location in the memory subsystem from which the in-order load instruction is to read-access a datum, when processing the in-order instruction;

control logic for directing said storing means to store the record, for accessing the record of the at least one out-of-order instruction to supply the address to said comparison logic; and a data selection mechanism, under the control of said control logic, for supplying one of the value stored in said storing means and a part thereof to the in-order instruction, when the addresses compared by said comparison logic are one of equal and overlapping, respectively.

27. The apparatus according to claim 26, wherein said storing means is one of a CAM structure and an area in the memory subsystem prespecified for storing records.

28. The apparatus according to claim 26, wherein said record further comprises an identifier for identifying in-order load instructions corresponding to the out-of-order load instruction.

29. The apparatus according to claim 28, wherein said apparatus further comprises means for removing the record stored in said storing means when the in-order instructions corresponding to the out-of-order instruction, as identified in the identifier, have been executed and determined to be non-interfering.

30. The apparatus according to claim 26, further comprising address generation logic for generating addresses of locations in the memory subsystem from which to read-access datums, when processing the at least one out-of-order load instruction and the in-order load instruction.

31. The apparatus according to claim 26, further comprising priority encoding means for detecting the datum having a lowest original position in the sequences of instructions, when multiple out-of-order load instructions exist which have read-accessed datums from the address of the location in memory from which the in-order load instruction is to read-access the datum.

32. An apparatus for enforcing consistency between data obtained during multiple read-accesses from a location in a memory subsystem of a computer processing system, wherein sequences of instructions are executed by at least one processor unit, the multiple read-accesses initiated by at least one previously executed load instruction and a currently executing load instruction, the apparatus comprising:

storing means for storing a record of the at least one previously executed instruction, wherein the record comprises an address of the location in the memory subsystem from which data was read-accessed and the data;

an interference test and priority encoder for comparing the address of the location from which the at least one previously executed instruction read-accessed the data with an address of the location from which the currently executing instruction is to read-access data, and determining whether the at least one previously executed instruction has associated therewith a later instruction number than the currently executing instruction, when processing the currently executing instruction;

control logic for directing said storing means to store the record, for accessing the record of the at least one previously executed instruction to supply the address to said interference test and priority encoder; and a data selection mechanism, under the control of said interference test and priority encoding logic, for supplying one of the data stored in said storing means and a part thereof to the currently executing instruction, when the addresses compared by said interference test and priority encoder are one of equal and overlapping, respectively, and the at least one previously executed instruction has the later instruction number associated therewith.

33. The apparatus according to claim 32, wherein said data selection mechanism supplies data stored in the memory subsystem to the currently executing instruction when the addresses compared by said interference test and priority encoder are not one of equal and overlapping.

34. The apparatus according to claim 32, wherein said data selection mechanism supplies data corresponding to a logically earliest interfering previously executed instruction from the storing means to the currently executing instruction, when there exist more than the at least one previously executed instruction.

35. The apparatus according to claim 32, wherein said interference test and priority encoder detects data having a lowest original position in the sequences of instructions, when there exist more than the at least one previously executed instruction which has read-accessed data from the address of the location in memory from which the currently executing instruction is to read-access the data.

36. The apparatus according to claim 32, wherein an instruction number is wide enough to encode at least twice as many instructions n as can be processed at a given time by the processing unit.

37. The apparatus according to claim 36, wherein the at least one previously executed instruction has the later instruction number than the currently executing instruction when the instruction number of the at least one previously executed instruction is in the range of n–1 numbers succeeding the instruction number of the currently executing instruction.

* * * * *